US011961078B2

(12) United States Patent
Gupta

(10) Patent No.: US 11,961,078 B2
(45) Date of Patent: Apr. 16, 2024

(54) KEYPAD DULCET AUTHENTICATION CARDLESS PAYMENT TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/225,719

(22) Filed: Jul. 25, 2023

(65) Prior Publication Data

US 2023/0368204 A1 Nov. 16, 2023

Related U.S. Application Data

(62) Division of application No. 16/901,177, filed on Jun. 15, 2020, now Pat. No. 11,748,754.

(51) Int. Cl.
*G06Q 20/40* (2012.01)
*G06N 20/00* (2019.01)
*G06Q 20/20* (2012.01)
*H04L 9/40* (2022.01)
*G06F 18/22* (2023.01)

(52) U.S. Cl.
CPC ......... *G06Q 20/4012* (2013.01); *G06N 20/00* (2019.01); *G06Q 20/202* (2013.01); *G06Q 20/206* (2013.01); *G06Q 20/401* (2013.01); *H04L 63/0428* (2013.01); *G06F 18/22* (2023.01); *G06Q 2220/00* (2013.01)

(58) Field of Classification Search
CPC ................ G06Q 20/00–425; G06N 20/00–20
See application file for complete search history.

(56) References Cited

U.S. PATENT DOCUMENTS

| 2018/0218142 | A1* | 8/2018 | Wang | G06F 3/023 |
| 2019/0286805 | A1 | 9/2019 | Law et al. | |
| 2019/0311098 | A1* | 10/2019 | Baldwin | G06N 3/045 |
| 2020/0134143 | A1* | 4/2020 | Deole | G06F 21/64 |

* cited by examiner

*Primary Examiner* — Mohammad A. Nilforoush
(74) *Attorney, Agent, or Firm* — Weiss & Arons LLP

(57) ABSTRACT

Architecture and methods may be provided to enable a user to authenticate and complete a cardless transaction at a point-of-sale ("POS") device. The POS device may include a keypad configured to receive a sequence of keypresses. The POS device may also include a processor configured to record the sequence of keypresses and tag each keypress with a time-stamp. The POS device may include a keypress controller configured to determine from the sequence of keypresses, a number of keypresses, a frequency of each keypress and a time-delay between each keypresss. The sequence of keypresses may be transmitted to a secure transaction network and, using a machine-learning pattern identifier, be configured to identify a pattern to the sequence of keypresses based off of the determined number of keypresses, the frequency and time-delay and then further verify that the pattern matches to a stored pattern to authenticate the cardless transaction.

5 Claims, 6 Drawing Sheets

KEYPAD DULCET AUTHENTICATION CARDLESS PAYMENT TECHNOLOGY

FIELD OF TECHNOLOGY

Aspects of the disclosure relate to performing transactions using cardless authentication.

BACKGROUND OF THE DISCLOSURE

Payment mechanisms typically rely on cards or other devices like mobile, laptop, desktop or payment wallet to make a payment. All of these channels are dependent on cards or other devices to make a payment. If a user forgets the card or other device then the user may not be able to make the payment.

It would be desirable, therefore, to have systems and methods to allow a user to authenticate himself at a point-of-sale ("POS") and/or online payment channel without the need for a card, mobile device, laptop, desktop device. This is desirable at least because it gives the user the opportunity to authenticate himself independent of the device(s) that the user is carrying with him. It would also be desirable to allow a user to authenticate himself without input of an additional biometric.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
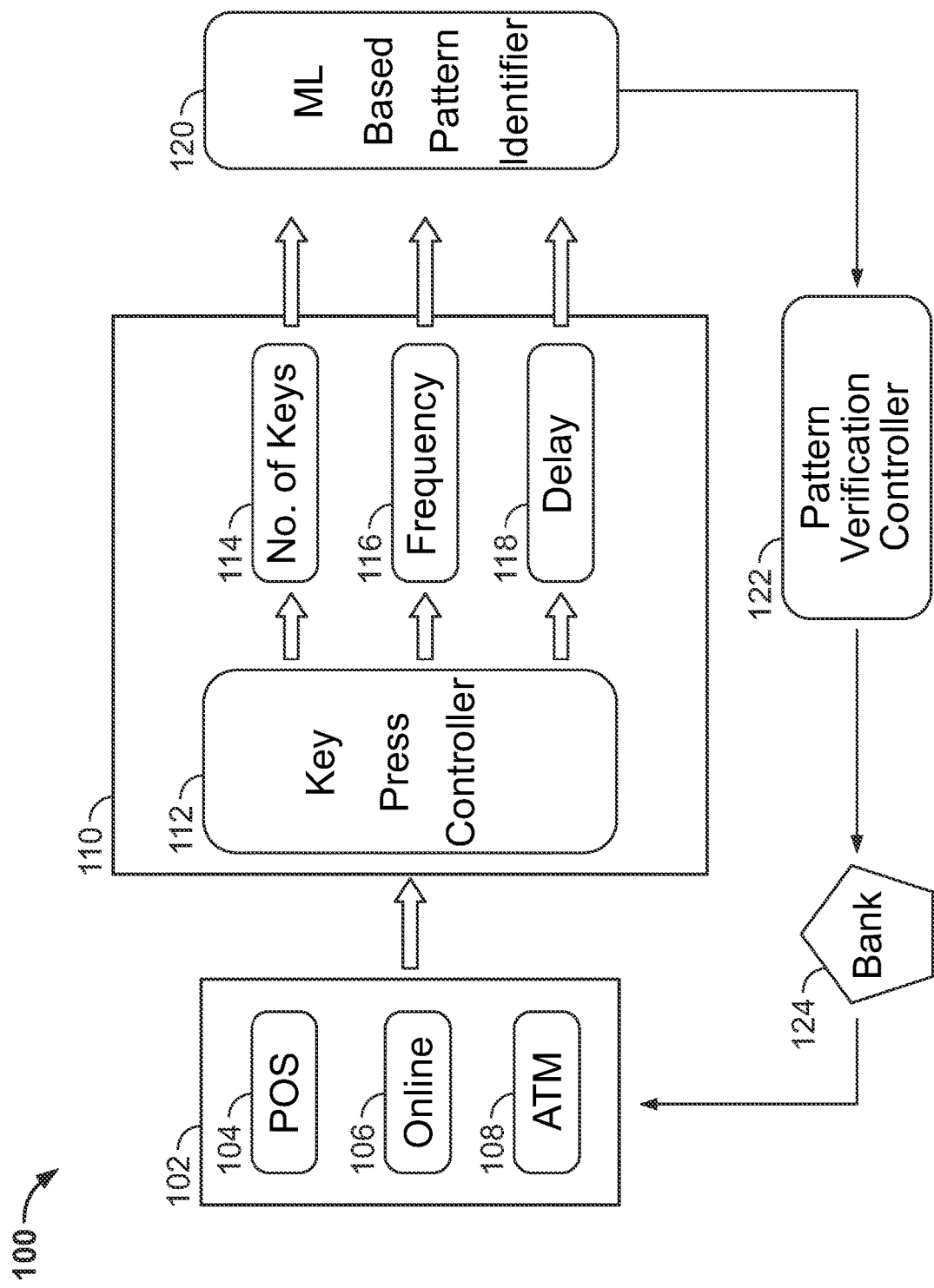
FIG. 1 shows an illustrative architecture in accordance with principles of the disclosure.

Architecture for a system that enables authentication and execution of a cardless transaction is provided. A cardless transaction may be performed at a point-of-sale ("POS") device within a store. The cardless transaction may be performed on a smart phone, laptop and/or tablet at any location. The cardless transaction may be performed on a website on the internet using the smart phone or other mobile device.

The cardless transaction may enable a transaction to be completed without the use of any physical credit card, debit card, smart card and/or electronic wallet.

The architecture may include a POS device. The POS device may include a keypad. The keypad may include a set of numeric and/or alphanumeric buttons that are configured to be depressed.

It should be appreciated that the keypad may be a touch keypad. The touch keypad may be displayed on a display screen at the POS device. The touch keypad may display numeric and/or alphanumeric keys. These keys may be configured to be depressed by a touch of a finger. These keys may be configured to be depressed by a touch of a stylus.

The keypad may be configured to receive a sequence of keypresses. The sequence of keypresses may be used as authentication for a cardless transaction. The sequence of keypresses, once verified, may be further used to execute and complete the cardless transaction.

The POS device may also include a processor. The processor may be configured to record the sequence of keypresses. The processor may also be configured to tag each keypress with a timestamp. The timestamp may stamp the start time of each keypress being depressed.

The keypad may be connected to a keypress controller included in the POS device. The keypress controller may be configured to determine from the sequence of keypresses a number of keypresses.

The keypress controller may also be configured to determine a frequency of each keypress. The frequency may include a rate of keypresses per unit of time. The frequency may determine the number of keypresses received in the total time of receipt of the sequence.

The keypress controller may also determine a time-delay between each keypresss. The time-delay may be calculated based off of the timestamp tagged to each keypress.

In some embodiments, the keypress controller may also be configured to calculate a duration of time for a keydown of each keypress when the keydown is greater than a pre-determined number of time. A keydown may be when a user presses on a key. The time before the user releases the pressure may be considered the time of the keydown. When the keydown is greater than a pre-determined number of time, the determination of the pattern may also be determined based on the keydown time.

The pre-determined number of time may be one second. The pre-determined number of time may be a half a second. When the duration of time of the keydown is greater than the pre-determined number of time, the keypress controller may be configured to tag the duration of time of the keydown.

The processor may be further configured to temporarily store the sequence, the timestamp, the number of keypresses, the frequency and the time-delay as authentication data for the cardless transaction.

The processor may then be configured to encrypt the authentication data in order to transmit the authentication data securely. Application programs within the POS device may utilize one or more algorithms to encrypt the data.

Software may be stored within the non-transitory memory and/or other storage media within the POS device. Software may provide instructions, that when executed by the processor, enable the POS to perform various functions. For example, software may include an operating system, application programs, web browser and a database. Alternatively, some or all of computer executable instructions of the smart card may be embodied in hardware or firmware components of the POS device.

Application programs, which may be used by the POS device, may include computer executable instructions for invoking user functionality related to communication, authentication services, and voice input and speech recognition applications. Application programs may utilize one or more algorithms that encrypt information, process received executable instructions, interact with an issuer or acquirer bank systems, perform power management routines or other suitable tasks.

Following encryption, the processor may be configured to transmit the encrypted authentication data to the secure transaction network for verification.

The secure transaction network may include a machine-learning ("ML") pattern identifier. The ML pattern identifier may be configured to decrypt the authentication data.

The ML pattern identifier may be an application. The ML pattern identifier may be enabled to identify a pattern of the sequence. The pattern may be enabled to be identified based off of the determined number of keypresses, the determined frequency and the determined time-delay.

In some embodiments, the ML pattern identifier may also use the calculated duration of time as part of identifying the pattern. The ML pattern identifier may identify the pattern further based off of the duration of time of the keydown.

It should be appreciated that the pattern of the sequence of the keypresses is irrespective of an alphanumeric value of each keypress.

The pattern verification controller may be configured to verify that the identified pattern maps to a stored pattern associated with an entity. The entity may be an individual that entered the sequence of keys at the POS device. The entity may have a pre-generated pattern stored within the secure transaction network. The mapping may be in order to authenticate the cardless transaction.

The pattern verification controller may determine if the pattern substantially matches to the stored pattern. The pattern verification controller may be configured to verify that the number of keypresses may be equal to a stored number of keypresses. The pattern verification controller may be further configured to verify that the frequency of the keypresses may be within a pre-determined range of a stored frequency of keypresses. The pattern verification controller may also be configured to verify that the time-delay between each keypress may be within a pre-determined range of a stored number of time for each time-delay.

An example of a sequence of keypresses may include a user depressing a first key on the keypad two times in a row. Then the user may pause for 2 seconds. Then the user may press a second key three times in a row. Then the user may pause for one second. Then the user may press a third key one time and hit the submit button.

It should be appreciated that the first, second and third key may not be any specific key. The numerical value of the key depressed may be insignificant and may not be recorded.

Furthermore, this architecture may enable a visually impaired individual a more seamless method for authenticating himself and making purchases and other transactions. The user may not need to know which specific keys the user is pressing on. Once the user pre-sets a personal pattern, the user can press any keys to authenticate himself because the pattern does not include the numerical value of the keypresses.

A method for authenticating and executing a cardless transaction between a first entity and a second entity may be provided. The method may include receiving authentication data at a point-of-sale device. The authentication data may not include presence of a card and may not include card account data. The authentication data may include a sequence of keypresses.

The method may include, following the receiving, tagging each keypress in the sequence with a timestamp. The method may also include encrypting the authentication data.

The method may also include transmitting the authentication data, using a secure communication channel, from the POS device to a secure payment network.

The method may include decrypting the authentication data. The method may include determining, from the authentication data, a pattern of the sequence of keypresses.

The pattern may include a number of keypresses. The pattern may also include a frequency of each keypress. The frequency may include a rate of keypresses per unit of time. The pattern may also include a time-delay between each keypresss. The time-delay may be calculated based off of the timestamp tagged to each keypress.

The method may also include verifying, by the secure payment network, that the pattern of the sequence of keypresses maps to a stored pattern of a sequence of keypresses stored within a personal profile account associated with the first entity.

In response to the verification, the method may include authenticating the transaction at the POS device between the first and second entity.

In some embodiments, when at least one of the number of keypresses, frequency of each keypress that is repetitive and the time-delay is not confirmed, the method may further include transmitting an error message to the POS device and terminating the transaction.

Time-delays may be counted in increments of whole seconds. Time-delays may be counted in increments of half seconds. Time-delays may be counted in milliseconds. In some embodiments, time-delays may be counted in nanoseconds.

In some embodiments, when calculating the time-delay between each keypress, the time-delay may be counted by whole seconds. In this embodiment, when the time-delay is less than half a second, the time-delay may be counted as a zero time-delay which may be interpreted as no time-delay. This may further be interpreted as two keypresses that immediately follow one after another. When the time-delay between two keypresses is equal to or greater than half a second, the time-delay may be calculated as one second. When the number of time between two keypresses is greater than one second, the time-delay may be rounded either up or down by whole seconds. For example, when the time-delay is equal to or greater than 1.5 seconds, the time-delay may be rounded up to 2 seconds. When the time-delay is less than 1.5 seconds, the time-delay may be rounded down to 1 second.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an architectural diagram 100 of the cardless payment system. The cardless payment system may enable a user to perform a transaction without a credit/debit card. The cardless payment system may enable the user to perform a transaction without a credit/debit card number. The cardless payment system may be configured to enable a user to input a sequence of keypresses into a keypad as a method of authenticating and completing a transaction.

The diagram 100 may include box 102. Box 102 may be a POS. The POS may be a device where a user can submit a payment for products being purchased. The POS may be a device a user is submitting payment for an invoice. The POS may be for other financial transactions.

The POS may be a physical POS terminal as shown at 104. The POS may be an online website where a user is making a purchase, as shown at 106. The POS device may be an automated teller machine ("ATM"), as shown at 108.

The POS 102 may include a keypad 110. The keypad 110 may include keys that may be depressed. The keypad may be displayed on a touch screen and may be tapped. The keypad may be configured to receive input of a sequence of keypresses on the keypad in order to authenticate a user.

The keypad 110 may include a keypress controller 112. Keypress controller 112 may be configured to identify the keys that may be depressed and/or tapped. The keypress controller 112 may be configured to identify the number of keys in the sequence, as shown at 114. Keypress controller 112 may be configured to determine the frequency, 116, of the sequence of keypresses. Keypress controller 112 may be configured to determine the time-delay 118 between each keypress. Keypress controller 112 may tag each keypress with a time-stamp in order to calculate the time-delay 118 between each keypress.

The POS may also include a processor that may be configured to transmit the data determined by the keypress controller 112 and may transmit the data to a machine-learning ("ML") based pattern identifier 120. ML based pattern identifier 120 may be associated with a secure payment network. ML based pattern identifier 120 may be an application on the secure payment network. ML based pattern identifier 120 may be linked to a pattern verification controller 122. Pattern verification controller 122 may also be an application on the secure payment network. The secure payment network may be a server. The secure payment network may communicate with a financial institution to complete a secure transaction.

ML based pattern identifier 120 may receive the data from the processor associated with the keypress controller. ML based pattern identifier 120 may be enabled to identify a pattern based off of the number of keypresses, the frequency, and the time-delay. The pattern may be a unique pattern that a user pre-generated as means of authentication of the user. ML based pattern identifier 120 may be enabled to decipher the unique pattern in order to identify and authenticate the user. The number of keypresses may be independent of the numerical value of each keypress. The number of time between each keypress may be a part of the identified pattern. The time may be calculated in seconds, milliseconds and in some embodiments, nanoseconds.

Pattern verification controller 122 may compare the identified pattern to a list of stored patterns in a database associated with the secure payment network. The user performing the transaction may have a pre-generated pattern stored in a personal account profile. The identified pattern may be compared to the pre-generated pattern. When the pattern verification controller 122 determines that the identified pattern and the pre-generated pattern substantially match, the bank associated with the secure payment network may authenticate and complete the transaction with the user at the POS 102.

Figure 2:
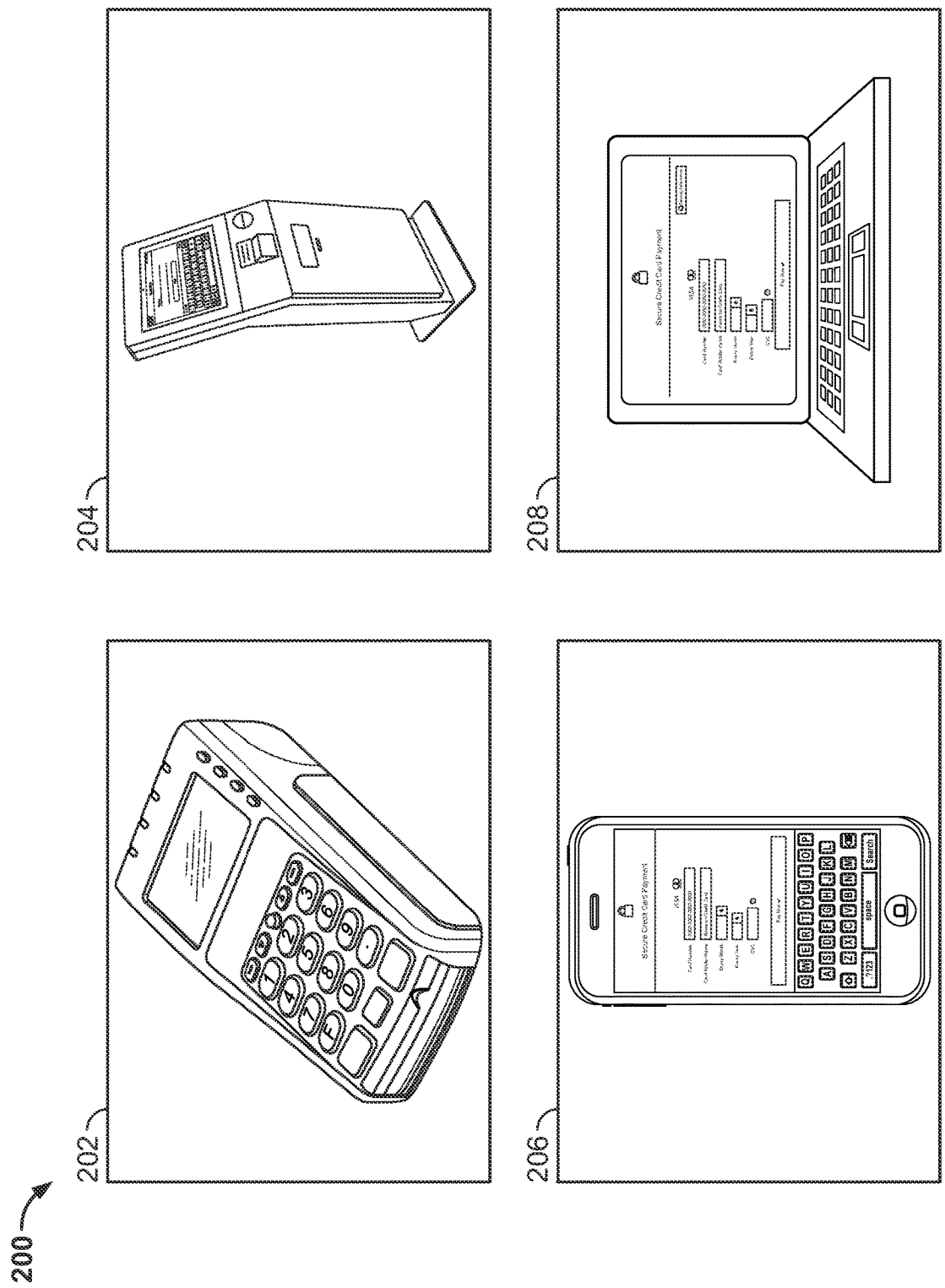
FIG. 2 shows an exemplary diagram in accordance with principles of the disclosure.

FIG. 2 shows an exemplary diagram of POS devices 200 in accordance with principles of the disclosure. POS devices 202, 204, 206 and 208 may be devices that may be enabled to accept a cardless transaction in accordance with principles of the disclosure. POS devices 202-208 may be enabled to accept, authenticate and complete the cardless transaction by receiving input of a sequence of keypresses by a user that may be identified as a unique pattern associated with the user.

POS devices 200 may include POS device 202. POS device 202 may be a credit/debit card machine. The machine may be handheld. The machine may be on a ledge or stand. Credit card machine 202 may include keys that may be configured to be depressed. Credit card machine 202 may be enabled to receive a cardless transaction. Credit card machine 202 may be enabled to receive a sequence of keypresses depressed on the keypad as authentication for the user in accordance with principles of the disclosure.

POS devices 200 may include POS device 204. POS device 204 may be a POS terminal with a touch-screen. POS device 204, in this exemplary diagram may be a self-checkout terminal. The touch-screen may display keys on the screen. Each keypress may be enabled by tapping the key on the screen. Self-checkout terminal 204 may be enabled to receive a cardless transaction in accordance with principles of the disclosure. Self-checkout terminal 204 may be configured to receive a sequence of keypresses tapped on the screen as authentication in accordance with principles of the disclosure.

POS devices 200 may include POS device 206. POS device 206 may be a mobile device. Mobile device 206 may be configured to perform a transaction. Mobile device 206 may be enabled to display a keypad on the screen. When a user is making a purchase and or any other transaction, the mobile device 206 may be configured to, in accordance with principles of the disclosure, perform a cardless transaction.

POS devices 200 may include POS device 208. POS device 208 may be a laptop. Laptop 208 may also be used to authenticate and complete a transaction in accordance with principles of the disclosure. Laptop 208 may include a keypad on the keyboard. Laptop 208, in some embodiments, may include a touch-screen. Both the keypad and the touch-screen, may be configured to receive input of the sequence of keypresses as a method of authenticating and completing a cardless transaction. Laptop 208 may be enabled receive the sequence of keypresses and authenticate a user to complete a transaction.

Figure 3:
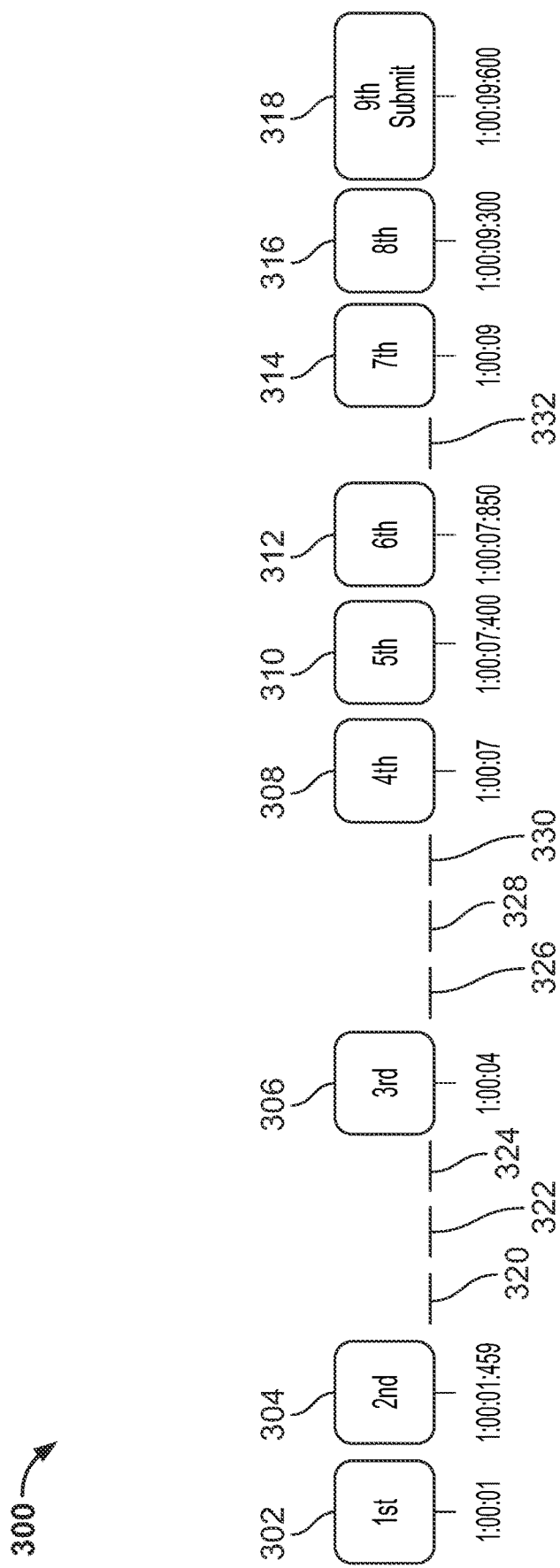
FIG. 3 shows an exemplary diagram in accordance with principles of the disclosure

FIG. 3 shows an exemplary sequence of keypresses 300. The sequence of keypresses 300 may be inputted to a keypad by a user. The user may be performing a transaction. The sequence of keypresses may be used in place of a credit card, debit card and/or card number. An identified and verified pattern, determined from the sequence of keypresses may preferably be enabled to authenticate the user and complete the transaction.

The sequence of keypresses 300 may include a number of keypresses that may be depressed and inputted as part of the sequence. The keypresses may include keypress 302, 304, 306, 308, 310, 312, 314, 316 and 318. Keypresses 302-218 may be displayed in order of receipt. Keypress 302 may be the first keypress and keypress 318 may be the last keypress. Keypress 318 may be the submit button on the keypad. Keypress 318 in some embodiments may not be included in the sequence. The time between keypress 316 and keypress 318 may, in some embodiments, be included in identifying the pattern to the sequence of keypresses.

In this example, keypress 302 may be the first keypress. Keypress 302 may include a time-stamp. The time-stamp for each keypress may be the time at which the key was pressed and/or tapped. Keypress 302 may be received at 1:00 and 1 second. Keypress 304 may be the second keypress. Keypress 304 may be the second keypress. Keypress 304 may be received at 1:00 and 1 second and 459 milliseconds. In this example, since the time calculated between the first and second keypress is less than a half a second, it may not be counted as a time-delay.

In some embodiments, when calculating the time between two keypresses, the system may round off the time. For example, if the time between two keypresses is less than 500 milliseconds (half a second), the system may calculate the time-delay as a zero time-delay. If the time between two keypresses is equal to or greater than 500 milliseconds, and less than or equal to one second, the system may calculate the time-delay as a one second time-delay.

Space 320 and 322 may be a time-delay between a keypress. In this example, the time-delay may be considered a time-delay when the time between one keypress and another keypress is greater than a half a second. The time between the second keypress and the third keypress is greater than a half a second. The time-delay may be approximately 2 and a half seconds. Since the time-delay is greater than 2.5 seconds, the time-delay may be rounded to three seconds, as shown at 324. The third keypress 306 may be received at 1:00 and 4 seconds. Following the third keypress, there may be a 3 second time-delay between the third keypress 306 and the fourth keypress 308. Each second may be displayed at spaces 326, 328 and 330.

The fourth keypress, 308, may be received at 1:00 and second seconds. The fifth keypress 310 may be received at 1:00 and seven seconds and 400 milliseconds. The sixth keypress 312 may be received at 1:00 and seven seconds and 850 milliseconds. Following the sixth keypress 312 there may be a one second time-delay prior to the seventh keypress, as shown at 332.

The seventh keypress 314 may be received at 1:00 and 9 seconds. The eighth keypress may be received at 1:00 and 9 seconds and 300 milliseconds. The ninth key may be the submit button 318. The ninth keypress may be received at 1:00 and nine seconds and 600 milliseconds.

Figure 4:
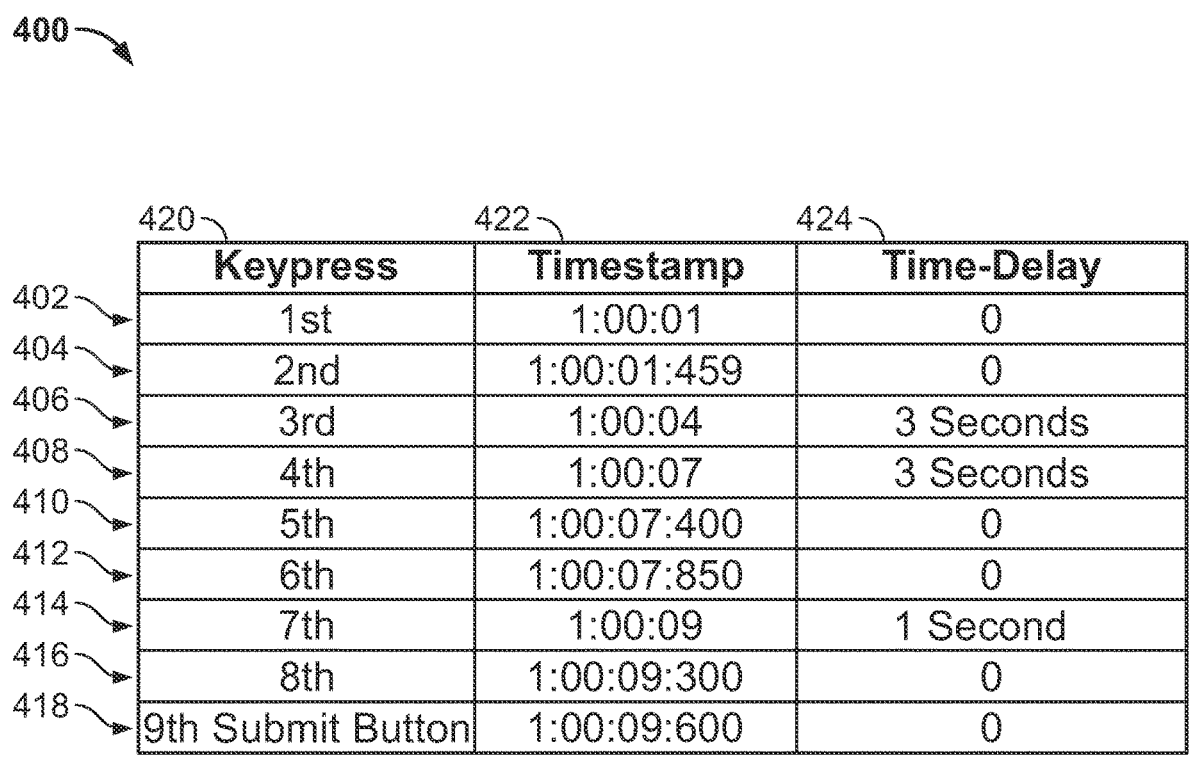
FIG. 4 shows an exemplary table in accordance with principles of the disclosure

FIG. 4 may be a table 400. Table 400 may display data associated with the sequence of keypresses displayed in FIG. 3. Table 400 may display data determined by the keypress controller and the ML pattern identifier. The data displayed in table 400 may enable identifying the pattern associated with the sequence of keypresses in order to authenticate a user and complete a transaction.

Column 420 may display the number keypress in the sequence. Column 422 may display the time-stamp that may be tagged to the keypress at the time of receipt of the keypress. Column 424 may display the time-delay calculated between each keypress. The time-delay may be calculated based off the time-stamp at 422. The time-delay 424 for each keypress 420, may identify the time-delay between the current keypress and the prior keypress.

The sequence is calculated at the start of the first keypress. At row 402, the first keypress is received at 1:00 and 1 seconds. There may be no time-delay since it is the first keypress in the sequence. At row 404, the second keypress is received at 1:00 and 1 second and 459 milliseconds. The time calculated between the first and second keypress is 459 milliseconds. Since 459 milliseconds is less than a half a second, there is no time-delay calculated as a part of the pattern.

At row 406, the third keypress is received at 1:00 and 4 seconds. The time calculated between the second and third keypress is 2 seconds and 501 milliseconds. 501 milliseconds is greater than a half a second. The system may then round up the calculated time-delay to the nearest second. This may be 3 seconds.

At row 408, the fourth keypress may be received at 1:00 and seven seconds. The time calculated between the third and fourth keypress is 3 seconds. The time-delay determined is a time-delay of 3 seconds.

At row 410, the fifth keypress may be received at 1:00 and 7 seconds and 400 milliseconds. The time calculated between the fourth and fifth keypress is 400 milliseconds. Since 400 milliseconds is less than a half a second, the time is rounded down to zero. There is no time-delay calculated for the fifth keypress.

At row 412, the sixth keypress may be received at 1:00 and seven seconds and 850 milliseconds. The time calculated between the fifth and sixth keypress may be 450 milliseconds. Since 400 milliseconds is less than a half a second, the time is rounded down to zero. There is no time-delay calculated for the fifth keypress.

At row 414, the seventh keypress may be received at 1:00 and 9 seconds. The time calculated between the sixth and seventh keypress is 1 second and 150 milliseconds. Since 150 milliseconds is less than half a second, the time is rounded down to the nearest second. The time-delay determined, therefore, is 1 second.

At row 416, the eighth keypress may be received at 1:00 and 9 seconds and 300 milliseconds. Because 300 milliseconds is less than half a second, the time may be rounded down to the nearest second. Therefore, there may be a zero time-delay between the seventh keypress and the eighth keypress.

At row 418, the ninth keypress may be received. The ninth keypress, in this example is the submit button. The ninth keypress may be received at 1:00 and 9 seconds and 600 milliseconds. The time between the eighth and ninth keypress may be 300 milliseconds. Three hundred millisecond may be less than half a second. Therefore, there may be no time-delay between the eighth and ninth keypress.

When determining the pattern of the sequence of keypresses, the determined number of keypresses in the sequence may be 9. This may include the submit button. In some embodiments, the submit button may not be calculated in the pattern.

The total time from the start of receipt of the first keypress through the receipt of the last keypress may be 8 seconds and 600 milliseconds. The frequency, in this example may be 9 keypresses in 00:08:600.

It should be appreciated that each of the keypresses may be the same numerical value. Each of the keypresses may be a different numerical value. The pattern may not be determined by the numerical value of the keypress. The pattern may be the same pattern despite the numerical value.

Following a determination of the time-delay between each keypress, the sequence of keypresses in FIG. 3 may playout as 2 keypresses, a 3 second delay, 1 keypress, a 3 second delay, 2 keypresses, a 1 second delay, 2 keypresses and then submit.

Figure 5:
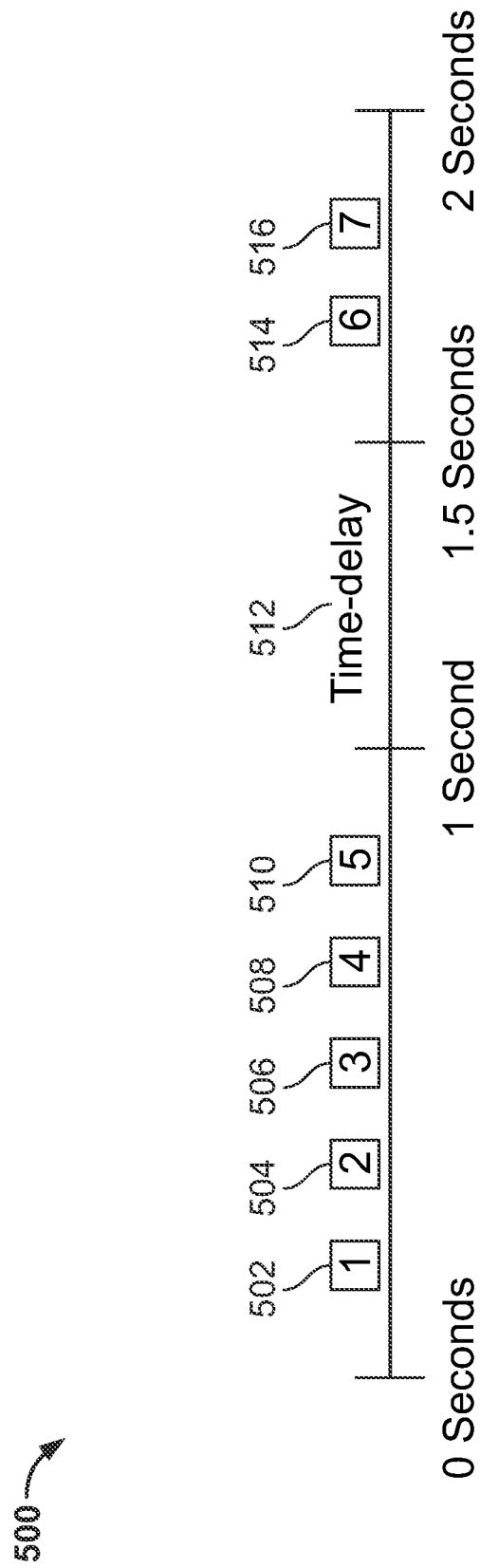
FIG. 5 shows an exemplary diagram in accordance with principles of the disclosure.

FIG. 5 shows another exemplary sequence of keypresses 500 in accordance with principles of the disclosure. The sequence of keypresses 500 may be received in a total of two seconds. This sequence may be comparable to a musical tune played on a piano.

The first 5 keypresses may all be received within one second. The first 5 keypresses may be received one after another without the user stopping for any significant delay. The first keypress 502 may be received at 2:00 and one second. The second keypress 504 may be received at 2:00 and one second and 100 milliseconds. The third keypress 506 may be received at 2:00 and one second and 300 milliseconds. The fourth keypress 508 may be received at 2:00 and one second and 650 milliseconds. The fifth keypress 510 may be received at 2:00 and one second and 900 milliseconds.

The time between the receipt of the fifth keypress and the sixth keypress may be about a half second. The time-delay 512 calculated may be, for this exemplary diagram, half a second. Since the total time of receipt is two seconds, a time-delay may be considered greater than zero when the time between two keypresses is equal to or greater than 400 milliseconds.

The sixth keypress 514 may be received at 2:00 and 2 seconds and 450 milliseconds. The seventh keypress 516 may be received at 2:00 and 2 seconds and 650 milliseconds.

The pattern for the sequence of keypresses 500 may be determined. The number of keypresses in the sequence is 7 keypresses. The total time from receipt of the first keypress to the seventh keypress is one second and 750 milliseconds. The frequency of the sequence may be 7 keypresses in one second and 750 milliseconds.

Figure 6:
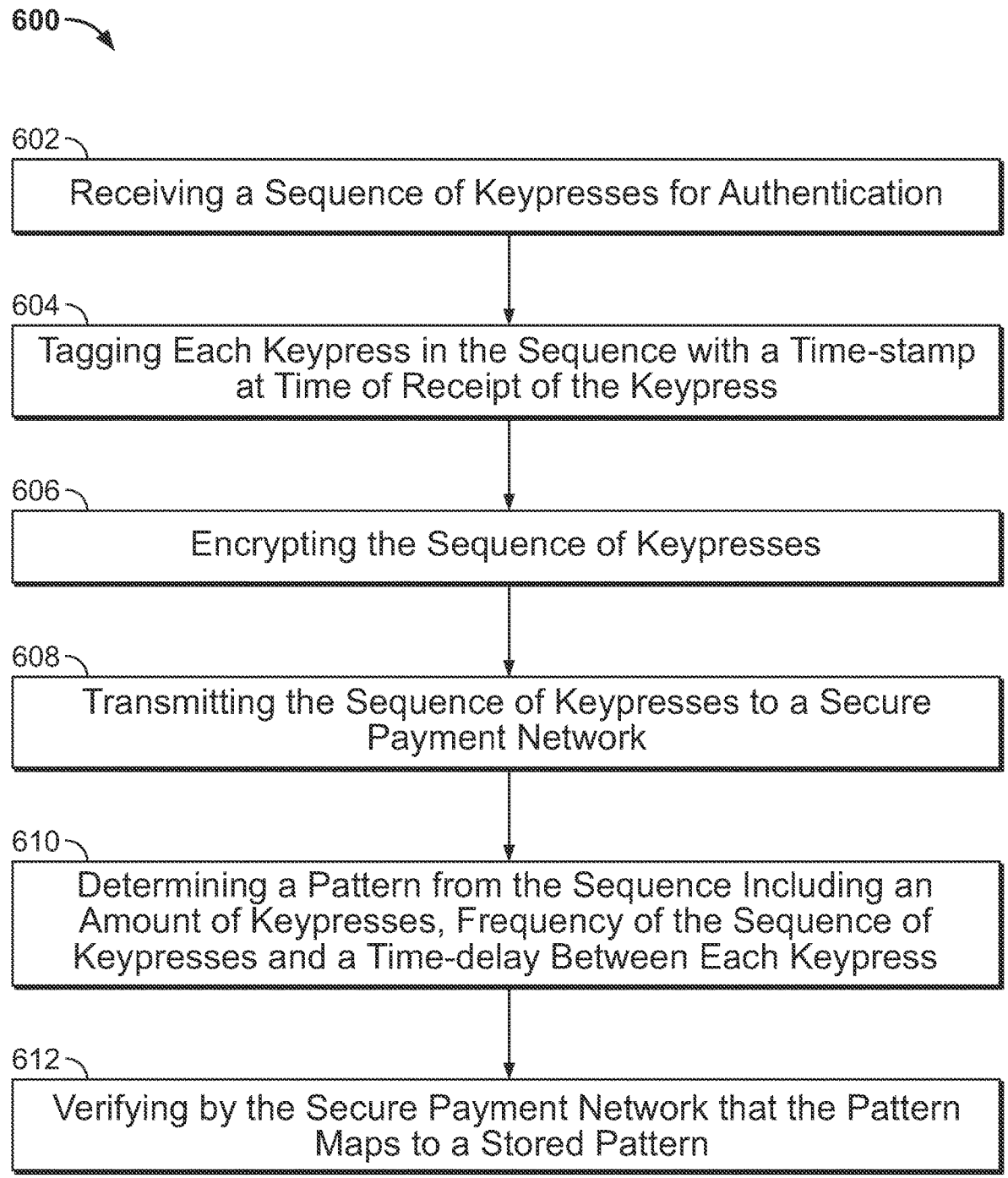
FIG. 6 shows an illustrative flowchart in accordance with principles of the disclosure.

FIG. 6 shows a flowchart of the steps 600 for authenticating a cardless transaction. At step 602, a sequence of keypresses may be received at a POS device from a user to authenticate the user to perform a transaction.

At step 604, each keypress may be tagged with a time-stamp. The time-stamp may mark the time of receipt of the keypress. The time-stamp may be the time the user presses the key on the keypad. In some embodiments, the duration of time the key is in keydown mode may also be calculated.

At step 606, the sequence of keypresses and the time-stamp may be encrypted prior to being transmitted to the secure payment network.

At step 608, the sequence of keypresses may be transmitted to the secure payment network. At step 610, a pattern may be determined from the sequence of keypresses. The pattern may be determined based on the number of keypresses, the frequency of the sequence of keypresses and a time-delay between each keypress.

At step 612, the secure payment network may verify the authenticity of the sequence of keypresses. The secure payment network may verify that the determined pattern maps substantially to a stored pattern associated with the user.

Thus, methods and apparatus for authenticating and executing a cardless transaction is provided. Persons skilled in the art will appreciate that the present invention can be practiced by other than the described embodiments, which are presented for purposes of illustration rather than of limitation, and that the present invention is limited only by the claims that follow.

What is claimed is:

1. A cardless payment architecture comprising:
a point-of-sale ("POS") device comprising:
a keypad configured to receive a sequence of keypresses as authentication for a cardless transaction;
a processor configured to record the sequence of keypresses and tag each keypress with a timestamp;
a keypress controller configured to determine from the sequence of keypresses:
a number of keypresses;
a frequency of each keypress, the frequency comprising a rate of keypresses per unit of time; and
a time-delay between each keypresss, the time-delay calculated based off of the timestamp tagged to each keypress; and
the processor further configured to:
store the sequence, the timestamp, the number of keypresses, the frequency and the time-delay as authentication data for the cardless transaction;
encrypt the authentication data; and
transmit the encrypted authentication data to the secure payment network for verification;
the secure payment network comprising:
a machine-learning ("ML") pattern identifier configured to:
decrypt, by the secure payment network, the authentication data; and
identify, by the secure payment network, a pattern to the sequence of keypresses based on the determined number of keypresses, the determined frequency and the determined time-delay; and
a pattern verification controller configured to verify that the identified pattern matches to a stored pattern associated with an entity, the matching to authenticate the cardless transaction, the verifying comprising confirming that:
the number of keypresses is equal to a stored number of keypresses;
the frequency of the keypresses is within a pre-determined range of a stored frequency of keypresses; and
the time-delay between each keypress is within a pre-determined range of a stored number of time for each time-delay.

2. The architecture of claim 1 wherein the POS device is one of a smartphone, laptop, online website and a POS device at a physical location.

3. The architecture of claim 1 wherein the pattern of the sequence of the keypresses is irrespective of an alphanumeric value of each keypress.

4. The architecture of claim 1 wherein the keypress controller is further configured to calculate a duration of time for a keydown of each keypress.

5. The method of claim 4 wherein when the duration of time of the keydown is greater than one second, the keypress controller is configured to tag the duration of time of the keydown and the machine learning pattern identifier is further configured to identify the pattern based off of the duration of time of the keydown.

* * * * *